United States Patent [19]

Uddenfeldt

[11] Patent Number: 5,793,757
[45] Date of Patent: Aug. 11, 1998

[54] TELECOMMUNICATION NETWORK HAVING TIME ORTHOGONAL WIDEBAND AND NARROWBAND SYTEMS

[75] Inventor: Jan Uddenfeldt, Hässelby, Sweden

[73] Assignee: Telefonaktiebolaget L M Ericsson (publ), Stockholm, Sweden

[21] Appl. No.: 601,138

[22] Filed: Feb. 13, 1996

[51] Int. Cl.$^6$ .................................................. H04J 13/00
[52] U.S. Cl. ........................... 370/335; 370/337; 370/350
[58] Field of Search .................................. 370/350, 206, 370/319–321, 314, 330, 332, 333, 335–337, 342–347, 503, 491; 375/202, 206, 200, 356

[56] References Cited

U.S. PATENT DOCUMENTS

| | | | |
|---|---|---|---|
| 4,799,252 | 1/1989 | Eizenhoffer et al. | 370/330 |
| 5,210,771 | 5/1993 | Schaeffer et al. | 370/330 |
| 5,260,967 | 11/1993 | Schilling. | |
| 5,295,152 | 3/1994 | Gudmundson et al. | |
| 5,345,439 | 9/1994 | Marston | 370/321 |
| 5,481,533 | 1/1996 | Honig et al. | |
| 5,511,068 | 4/1996 | Sato | 370/337 |
| 5,533,013 | 7/1996 | Leppanen | 370/206 |
| 5,572,516 | 11/1996 | Miya et al. | 370/342 |
| 5,577,024 | 11/1996 | Malkamaki et al. | 370/337 |

FOREIGN PATENT DOCUMENTS

| | | |
|---|---|---|
| 0 600 713 A2 | 6/1994 | European Pat. Off. |
| 0 668 664 A1 | 8/1995 | European Pat. Off. |
| WO 93/15573 | 8/1993 | WIPO. |
| WO 93/21698 | 10/1993 | WIPO. |
| WO 95/20277 | 7/1995 | WIPO. |

OTHER PUBLICATIONS

Ruprecht J et al.: Code Time Division Multiple Access: An Indoor Cellular System, 10 May 1992, From Pioneers To The 21st Century, Denver, May 10–13, 1992, vol. 2 of 2, pp. 736–739, IEEE.

Primary Examiner—Chau Nguyen
Attorney, Agent, or Firm—Jenkens & Gilchrist

[57] ABSTRACT

A telecommunications network including a CDMA system and FDMA/TDMA system, both operating in a common frequency range, is disclosed. In an embodiment of the invention, the transmission and reception of narrowband FDMA/TDMA signals on a plurality of radio frequency channels within FDMA/TDMA system is synchronized such that at least one time slot of each TDMA frame on each radio channel is reserved. The transmission and reception of CDMA signals in the CDMA system is then performed during the reserved time slots of each TDMA frame. In an alternative embodiment, complete TDMA frames on each radio channel are reserved for CDMA transmission and reception.

9 Claims, 7 Drawing Sheets

TELECOMMUNICATION NETWORK HAVING TIME ORTHOGONAL WIDEBAND AND NARROWBAND SYTEMS

BACKGROUND OF THE INVENTION

1. Field of the Invention

The present invention relates generally to telecommunication systems and, more specifically, to a method and apparatus for operating a telecommunication network including a code division multiple access (CDMA) communication system and a frequency division multiple access/time division multiple access (FDMA/TDMA) communication system operating within a common frequency range.

2. History of the Prior Art

In most European countries, the radio frequency band between 935–960 MHZ and 890–915 MHZ is reserved for use by the pan-European Group Speciale Mobile (GSM) cellular communications system. GSM uses a frequency duplex arrangement whereby the upper frequency range (935–960 MHZ) is used for downlink transmission from base stations to mobile stations and the lower frequency range (890–915 MHZ) is used for uplink transmissions from mobile stations to base stations. GSM is a hybrid frequency division multiple access/time division multiple access (FDMA/TDMA) system where the 25 MHZ wide uplink and downlink bands are each subdivided into 125 paired channels each 200 kHz wide. Each 200 kHz wide channel is further subdivided into 8 time slots. Where several operators occupy the same geographic region, guard bands must be provided between the frequency assignments resulting in some loss of useable bandwidth. Slow frequency hopping may also be used in an GSM system. In slow frequency hopping, the frequency on which a single user transmits in one of the 8 time slots changes between transmission bursts. The user's transmissions are then effectively spread across the frequency range of the system. When slow frequency hopping is used, GSM may be considered as a hybrid FDMA/TDMA/CDMA system where the CDMA is frequency hopping code division multiple access (FH-CDMA).

Another hybrid FDMA/TDMA system is described by TIA/EIA interim standard IS-136 (IS-136). IS-136 also employs a frequency duplex arrangement with downlink frequencies in the 869–894 MHZ range and uplink frequencies in the 824–869 MHZ range. With 30 kHz channel spacing and 3 time slots per channel, IS-136 provides 832 paired frequency/time slot combinations for digital communications. The IS-136 standard also allows analog communications at certain frequencies that may be reserved by a system operator for analog communications according to the TIA/EIA-553 (AMPS) standard.

One system, which could be considered a hybrid FDMA/TDMA/CDMA system, is described by TIA/EIA interim standard IS-661. In IS-661 direct sequence CDMA (DS-CDMA) modulation is used but orthogonality between users is provided using unique time and frequency slot combinations.

Another example of a hybrid FDMA/DS-CDMA system is described by TIA/EIA interim standard IS-95A (IS-95). IS-95 operates over the same frequency range as IS-136 and also employs frequency duplexing. The uplink and downlink frequency bands are each divided into 20 paired, 1.25 MHZ wide, channels. Separation of user communications within the frequency bands is provided through the use of orthogonal spreading codes and power control is provided through the use of slotted time division power control groups. The IS-95 standard also allows analog communications at certain frequencies that may be reserved by a system operator according to the AMPS standard.

With such a proliferation of competing wireless multiple access techniques, several methods for operating different systems for operation in the same geographic region have been proposed. One such combination of different systems would be a FDMA/TDMA system and a CDMA system.

The simplest method of overlaying FDMA/TDMA and/or CDMA systems to operate along with other systems in a common geographic region is relatively easy to implement since it simply requires that different portions of the frequency spectrum are allocated to each system. This is done, for example, in IS-95, when a system operator allocates a portion of the frequency spectrum for digital DS-CDMA communications and another portion of the frequency spectrum for analog FDMA communications using the TIA/EIA 553 (AMPS) standard.

As the bandwidth of frequency bands used in FDMA/CDMA systems, such as the IS-95 system, increase beyond 1.25 MHZ, the solution of using frequency planning to provide orthogonality between the relatively narrowband FDMA/TDMA systems and the wideband FDMA/CDMA becomes more challenging. If, for example, the bandwidth of a wideband CDMA system is 10 MHZ, orthogonal frequency planning where multiple operators exists may be virtually impossible given a set frequency system allocation, and thus some frequency overlap of the two systems may be inevitable.

As the signal energy in a CDMA system is spread across a wide bandwidth, the CDMA system may not present a significant noise source to a narrowband FDMA or FDMA/TDMA system. This is even more true as the bandwidth of the CDMA system increases. Thus, if the bandwidth of the CDMA system is wide enough, simultaneous operation of a wideband CDMA system should not significantly affect a narrowband FDMA or FDMA/TDMA system. However, the interference generated by a narrowband FDMA or FDMA/TDMA system presents a rather significant amount of interference to a wideband CDMA system prohibiting simultaneous operation of both.

For the 1900 MHZ personal communications service (PCS) proposed in North America, the interference problem is overcome by requiring the PCS operators to move narrowband microwave users within the band to another frequency range.

Another solution to the FDMA/TDMA and CDMA system co-existence problem is described in U.S. Pat. Nos. 5,185,762 and 5,351,269 which employ, in various ways, the use of a combline filter to notch out the narrowband FDMA or FDMA/TDMA signals which arise within the bandwidth of a DS-CDMA system or to notch out the DS-CDMA signals which may interfere with the narrowband signals.

A different solution is described in U.S. Pat. No. 5,161,168 and U.S. Pat. No. 5,228,053 in which a wideband DS-CDMA system having many times the bandwidth of the narrowband FDMA or FDMA/TDMA system is situated outside the radiation lobe of the narrowband antenna users.

Yet another solution is described in U.S. Pat. No. 5,377,223 in which DS-CDMA signals are notched out of the narrowband FDMA or FDMA/TDMA in the frequency domain by using a so-called notch gate to notch out the Fourier series coefficients at selected bands of interest. This technique is used both on the transmit and receive side of the DS-CDMA system.

Each of the above solutions presents certain inefficiencies in the operation of the co-existing systems. The solutions either require that the frequencies assigned to each system be restricted or that additional equipment be added to the CDMA system. Therefore, a need exists for a method and apparatus that allows a wideband CDMA system and an existing narrowband FDMA/TDMA system to be operated in a common frequency range in a manner that does not restrict frequency usage or require complicated additional equipment.

SUMMARY OF THE INVENTION

The present invention provides a method and apparatus for operating a telecommunications network including a code division multiple access (CDMA) communications system and a frequency division multiple access/time division multiple access (FDMA/TDMA) communications system within a common geographic region using a common frequency range for both systems.

The transmission and reception of narrowband FDMA/TDMA signals on a plurality of radio frequency channels within the FDMA/TDMA system is synchronized such that at least one time slot on each radio frequency channel is reserved for CDMA transmissions. The transmission and reception of CDMA signals in the CDMA system is then performed during the free time slots. In this manner the transmissions of the FDMA/TDMA system and the CDMA system are made time orthogonal to one another.

By using the principle of time orthogonality, no special filtering, frequency planning, or antenna placement is required. As all of the transceivers in a typical radio base station are synchronized to the same reference, no special equipment is required in the FDMA/TDMA base station.

In an embodiment of the invention radio base station circuitry located in each cell of a cellular radio communication network includes a FDMA/TDMA radio base station, operating according to the Group Speciale Mobile (GSM) system standard, and a wideband CDMA radio base station, operating within a bandwidth of on the order of 10 MHZ. The bandwidth of the FDMA/TDMA and CDMA radio base stations overlap in a common frequency range. The radio base station circuitry further includes a base station controller for synchronizing the operation of the FDMA/TDMA and DS-CDMA radio base stations.

Each of the FDMA/TDMA and CDMA radio base stations transmits on a downlink radio channel to FDMA/TDMA and CDMA mobile stations, respectively, and receives on an uplink radio channel, from FDMA/TDMA and CDMA mobile stations, respectively. The operation of the FDMA/TDMA and CDMA base stations is made time orthogonal by reserving at least one time slot of TDMA frames in which the FDMA/TDMA base station transmits and receives for CDMA base station transmission and reception. The base station controller synchronizes the operation of the FDMA/TDMA and CDMA base station so that the system operates in a non-interfering manner.

In another embodiment of the invention the FDMA/TDMA radio base stations operate according to the IS-136 system standard. In this embodiment, the operation of the FDMA/TDMA and CDMA base stations is made orthogonal by reserving at least one time frame of a consecutive series of TDMA time frames in which the FDMA/TDMA base station transmits and receives for CDMA base station transmission and reception.

The features and advantages of the present invention will be readily apparent to one of ordinary skill in the art from the following written description when read in conjunction with the drawings in which like reference numerals refer to like elements.

BRIEF DESCRIPTION OF THE DRAWINGS

An exemplary embodiment of the invention will now be described in detail with reference to accompanying drawings, in which.

DETAILED DESCRIPTION

In the following description, for purposes of explanation and not limitation, specific details are set forth, such as particular circuits, circuit components, techniques, etc., in order to provide a thorough understanding of the invention. However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1A:
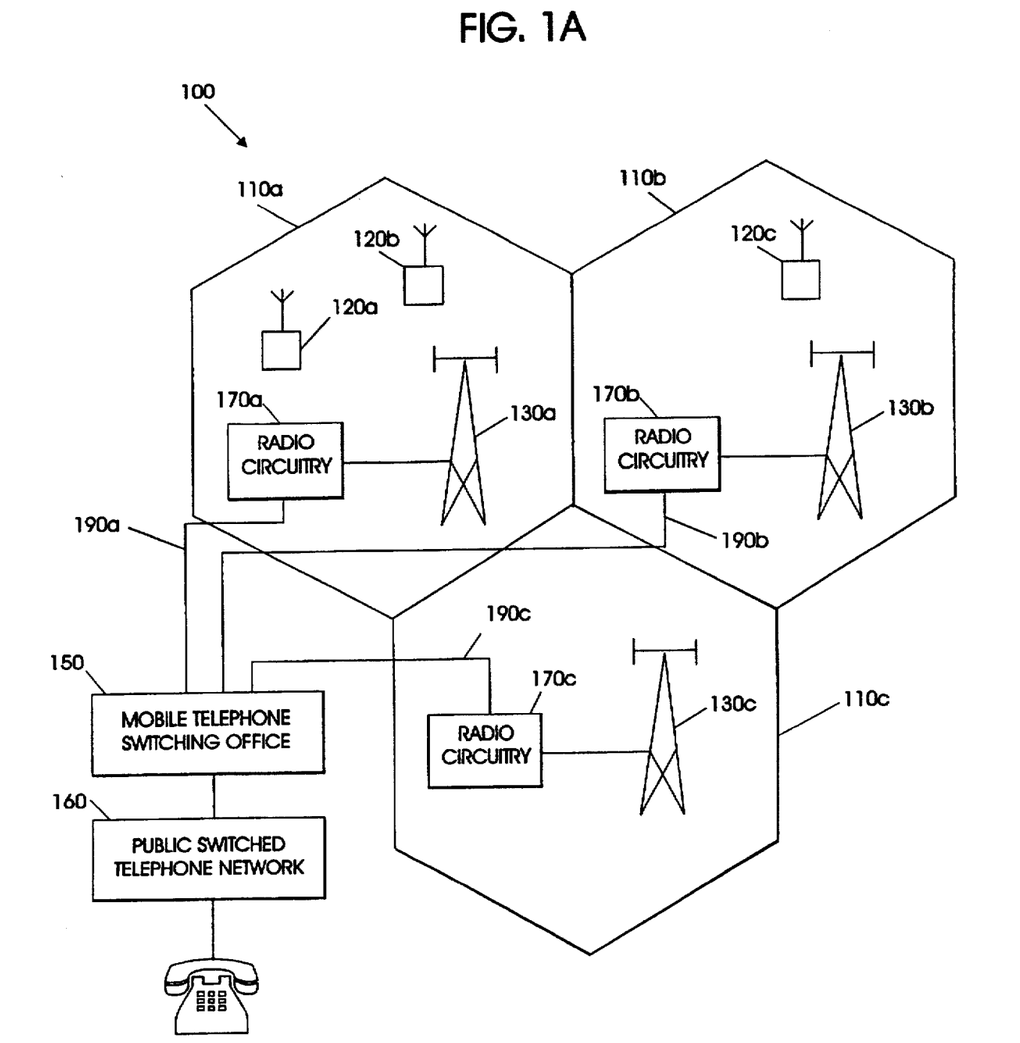
FIGS. 1A and 1B illustrate a cellular radio communication network according to an embodiment of the present invention.
Figure 1B:
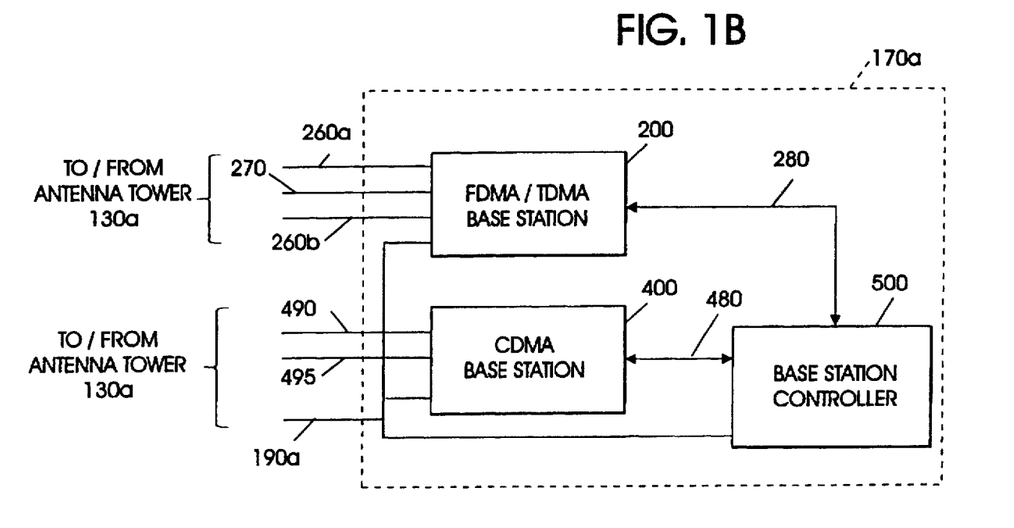

Referring now to FIGS. 1A and 1B, therein is illustrated a cellular radio communications network 100 according to an embodiment of the present invention. Telecommunications network 100 includes a code division multiple access (CDMA) communications system and a frequency division multiple access/time division multiple access (FDMA/TDMA) communication system that both operate within a common frequency range. As shown, the geographic region served by the network 100 is subdivided into a number of smaller regions of radio coverage known as cells. In FIG. 1 three cells, cells 110a–110c are shown, with each of cells 110a–110c having associated with it respective radio base station circuitry 170a–c. While three cells are shown, the system 100 may include more or less than three cells in number. Each portion of radio base station circuitry 170a–c has associated with it a radio tower 130a–c where the transmit and receive antennas (not shown) are located. Note that the use of hexagon-shaped cells is only a graphically convenient way of illustrating areas of radio coverage associated with a particular base station. In actuality, cells may be irregularly shaped, overlapping, and not necessarily contiguous. Distributed within cells 110a–c are a plurality of mobile stations 120a–c. Base stations 170a–c provide two-way radio communication with mobile stations 120a–c located within the respective cells. Mobile stations 120a–c may roam throughout the cells of telecommunications network 100. Each of the sections of radio base station circuitry 170a–c are coupled to the mobile telephone switching office (MTSO) 150 over interface 190a–c which provides a connection to the public switched telephone network (PSTN) 160.

FIG. 1B illustrates a cell of the system of FIG. 1A showing radio base station circuitry 170a. The details of radio base station circuitry 170b–c are identical to that of radio base station 170a. Radio base station circuitry 170a comprises both a narrowband FDMA/TDMA radio base station 200 and a wideband CDMA radio base station 400. A separate base station controller 500 controls the operation of each base station 200 and 400, over interfaces 280 and 480, respectively. Although the narrowband FDMA/TDMA radio base station 200, the wideband CDMA base station 400, and the base station controller 500 are shown as separate elements, it will be obvious to one of ordinary skill in the art that these elements may be combined into a single radio base station. Also, FIG. 1B shows the narrowband FDMA/TDMA radio base station 200 and the wideband CDMA base station 400 of radio base station circuitry 170a using one radio antenna tower 130a. Although this is preferred as a means to lower costs, it is anticipated by the present invention that separate antenna towers may be used for each base station and that the separate radio towers need not be geographically co-located. It will also be obvious to one of ordinary skill that, although described for the three cells of FIG. 1, the present invention may be applied to a system having many cells of various sizes, shapes, and coverage.

Figure 2:
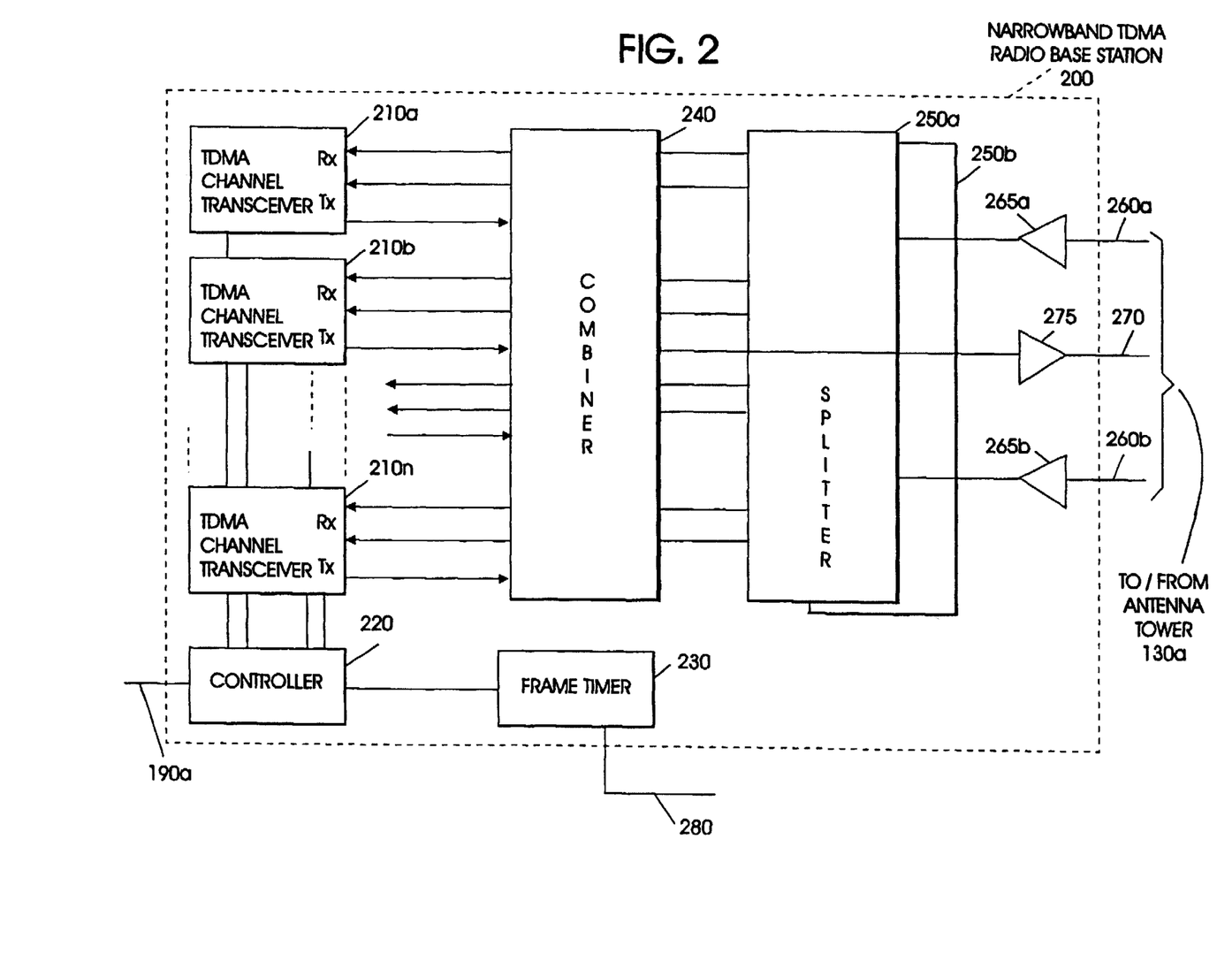
FIG. 2 is a block diagram of a FDMA/TDMA radio base station according to an embodiment of the invention.

The block diagram of narrowband FDMA/TDMA radio base station 200 is illustrated in FIG. 2. In the embodiment shown in FIG. 1, FDMA/TDMA radio base station 200 operates according to the GSM system standard. Controller 220 controls communications with MTSO 150 over interface 190a. Radio base station 200 comprises one or more TDMA channel transceivers 210a–n, each of the transceivers 210a–n is conditioned to provide uplink and downlink radio communications on a specific radio frequency band. The specific frequency band for each transceiver 210a–n may be fixed, or electronically tunable. The output of each transceiver 210a–n is coupled to combiner 240 which combines a plurality of inputs into a single output which is coupled to power amplifier 275 and hence to antenna tower 130a over antenna 270. On the receive side, radio signals received on antennas 260a–b from antenna tower 130a are coupled respectively to low noise amplifiers 265a–b and hence to power splitters 250a–b. Power splitters 250a–b divide the received amplified radio frequency signal into a plurality of outputs which are coupled to transceivers 210a–n as shown. Each transceiver 210a–n receives signals from at least two antennas of antenna tower 130a, the two antennas being spatially separated such that the radio signals with uncorrelated fading are received at each antenna 260a–b. The received signals are diversity combined according to known techniques. Transceivers 210a–n operate at a specific frequency band, such as, for example 200 kHz wide frequency band located in the GSM frequency range previously mentioned. Each radio frequency band is further subdivided into, for example, eight time slots, each user being assigned a specific time slot. Synchronization of transceivers 210a–n is provided by controller 220 and frame timer 230 which may be synchronized with all the other base stations 170a–c by signals exchanged with base station controller 500 over interface 280.

Figure 3:
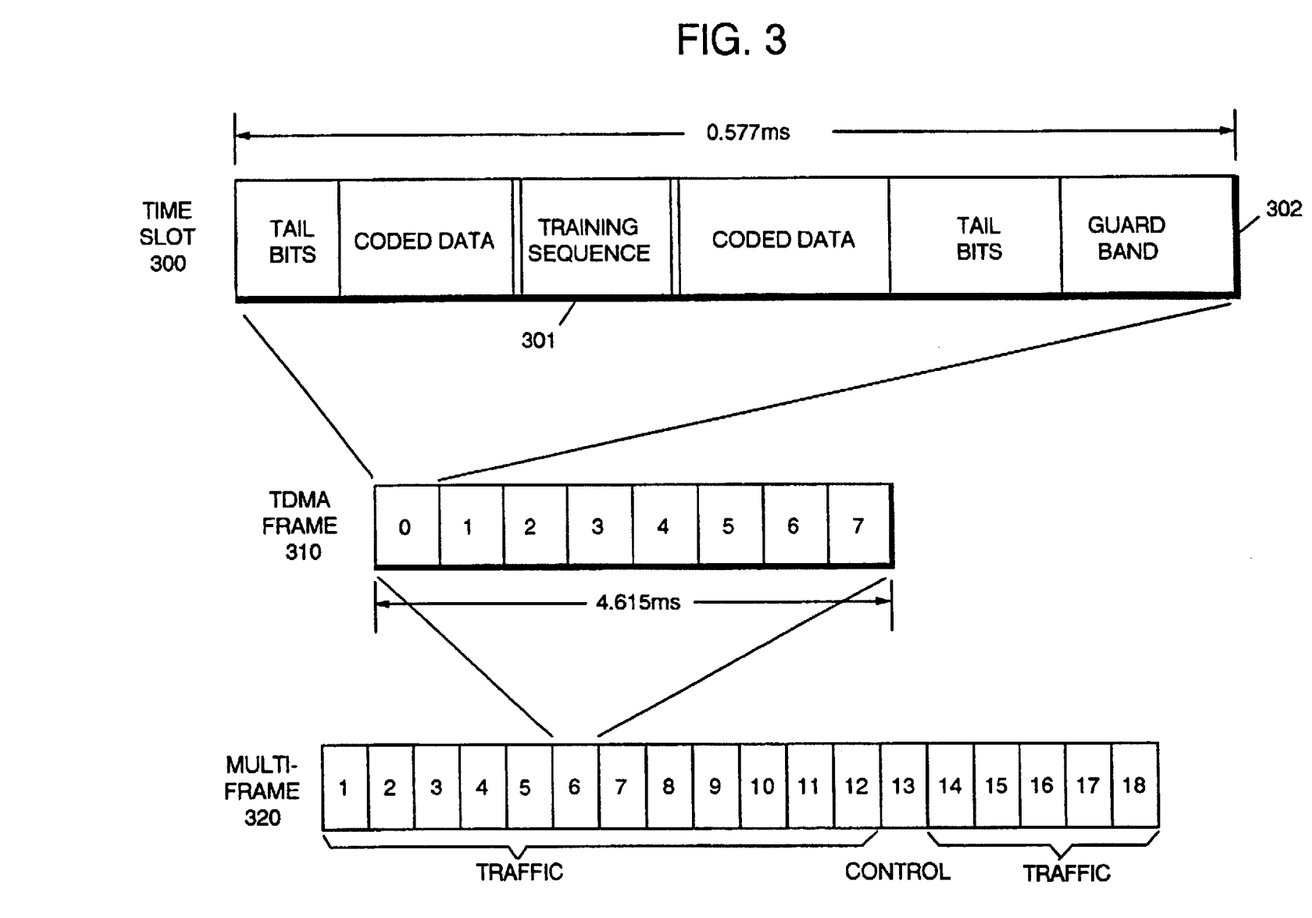
FIG. 3 illustrates a FDMA/TDMA frame and time slot structure that may be utilized in an embodiment of the invention.

Referring now to FIG. 3, therein is illustrated a FDMA/TDMA frame and time slot structure that may be utilized in an embodiment of the invention. The frame structure of FIG. 3 is identical to the frame structure used in GSM. Each TDMA frame 310 is 4.615 ms long and divided into eight time slots 300 each approximately 0.577 ms in duration. Each time slot 300 comprises synchronization, data, and error correction fields. Each mobile station 120a–c in cellular communication network 100 is assigned a particular frequency and time slot combination over which control and/or traffic information is broadcast to the mobile station and received from the mobile station by FDMA/TDMA base station 200. The FDMA/TDMA frames are arranged into longer multiframes 320 in which traffic (i.e., voice and data) and intermixed with control information.

In TDMA, co-channel interference is avoided by using unique time slot/frequency combinations such that no two users in the same geographic region simultaneously use the same time slot/frequency combination at any one time. In contrast, in a CDMA system mobile stations use the same frequency range at the same time; separation is achieved through the use of orthogonal code sets. One such system known to the state of the art is IS-95. In the IS-95 downlink, users are assigned a unique Walsh code. Codes assigned to other users in the same cell are arithmetically orthogonal to each other. Given that all the signals arrive at the base station with approximately the same power level, the base station can correlate the composite received signal to a particular user code which also serves to decorrelate that part of the signal intended for other users. This technique is known as direct sequence CDMA (DS-CDMA).

Figure 4:
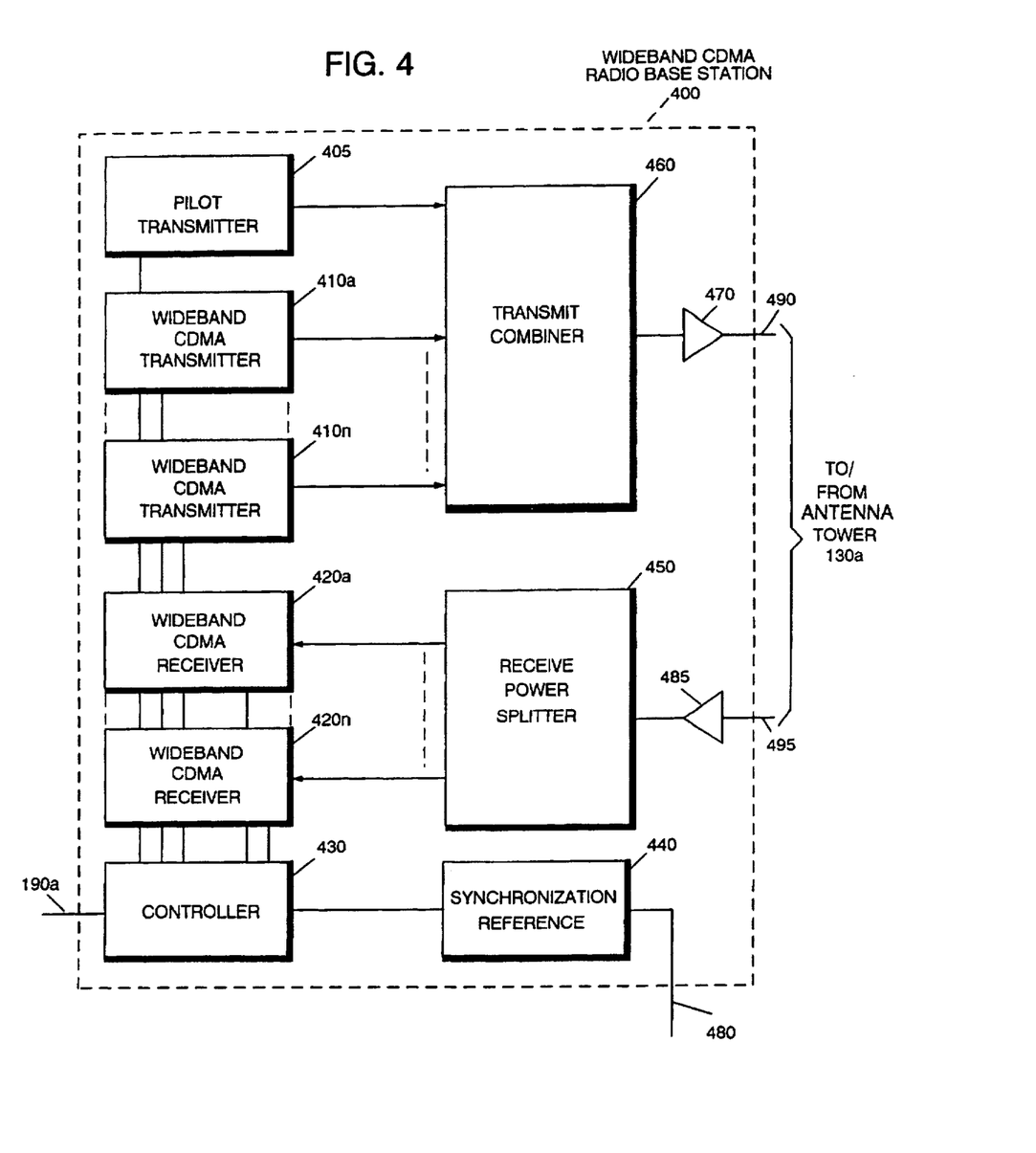
FIG. 4 is a block diagram of a CDMA radio base station according to an embodiment of the invention.
Figure 5:
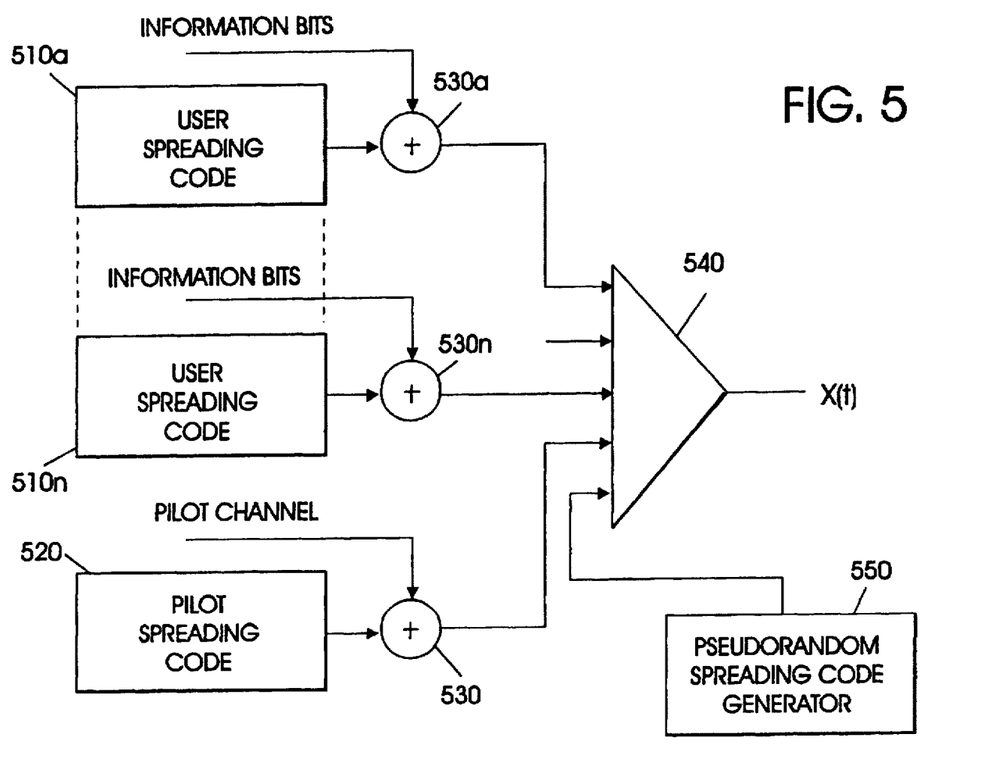
FIG. 5 is an illustration of a wideband CDMA downlink signal format that may be utilized in an embodiment of the invention.

Referring now to FIG. 4, therein is illustrated a block diagram of DS-CDMA base station 400 of FIG. 1B. CDMA transmitters 410a–n generate pseudorandom spread spectrum modulated signals as shown in, for example, FIG. 5. In FIG. 5, information bits (i.e., user data such as coded voice information) from user n are modulo 2 added in adder 530n with the unique spreading code 510n assigned to user n. In general, there can be as many users as there are unique spreading codes. A pilot code channel is also generated by adding a pilot code sequence (e.g., a series of all 0's or 1's) with a pilot spreading code 520. The pilot spreading code 520 may be a reserved code from the set of user codes. The coded user information and the coded pilot channel are combined and spread spectrum modulated by adding the composite signal with a pseudorandom noise (PN) code generated in pseudorandom code generator 550. As shown in FIG. 4, the PN modulated signals from each transceiver are coupled to transmit combiner 460 and hence to power amplifier 470. Power amplifier 470 amplifies the modulated signals and couples the amplified signal over antenna 490 to antenna tower 130a which radiates the signal to mobile stations. There may be one or more pilot channels broadcast from each wideband CDMA radio base station 400. Controller 430 controls communications with MTSO 150 over interface 190a.

PN modulated signals received from mobile stations by antenna tower 130a are received over antenna 495 and coupled to low noise amplifier 485 and hence to power splitter 450 which splits the received amplified signal into a plurality of outputs each coupled to a respective receiver of wideband CDMA receivers 420a–n. Each of wideband receivers 420a–n then correlates the composite received signal with the particular code in order to extract the underlying information signal according to known techniques.

Figure 6:
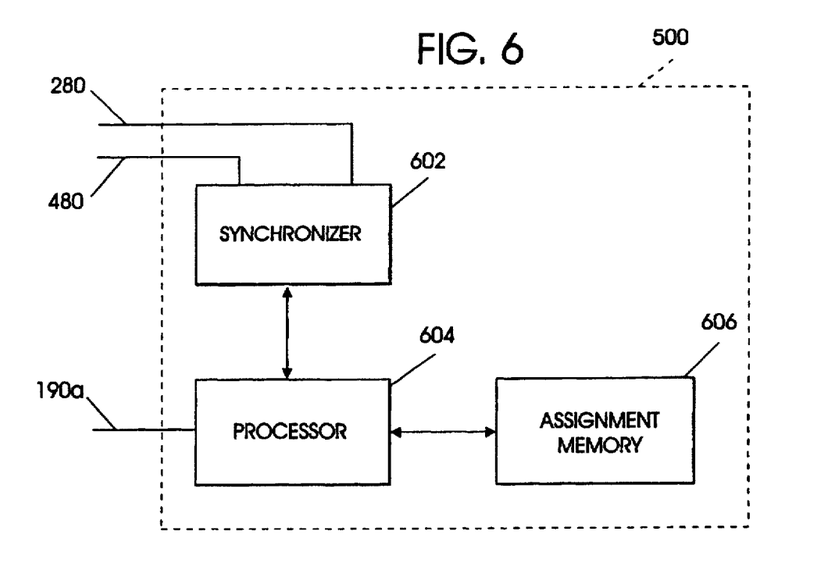
FIG. 6 is a block diagram of a base station controller according to an embodiment of the invention.

FIG. 6 is a block diagram of a base station controller according to an embodiment of the invention. Base station controller 500 comprises synchronizer 602, processor 604 and assignment memory 606. Synchronizer 602 communicates with FDMA/TDMA radio base station 200 and CDMA radio base station 400 over interfaces 280 and 480, respectively, to provide synchronization control. Processor 604 receives synchronizing information from MTSO 150 over antenna 190a.

Figure 7:
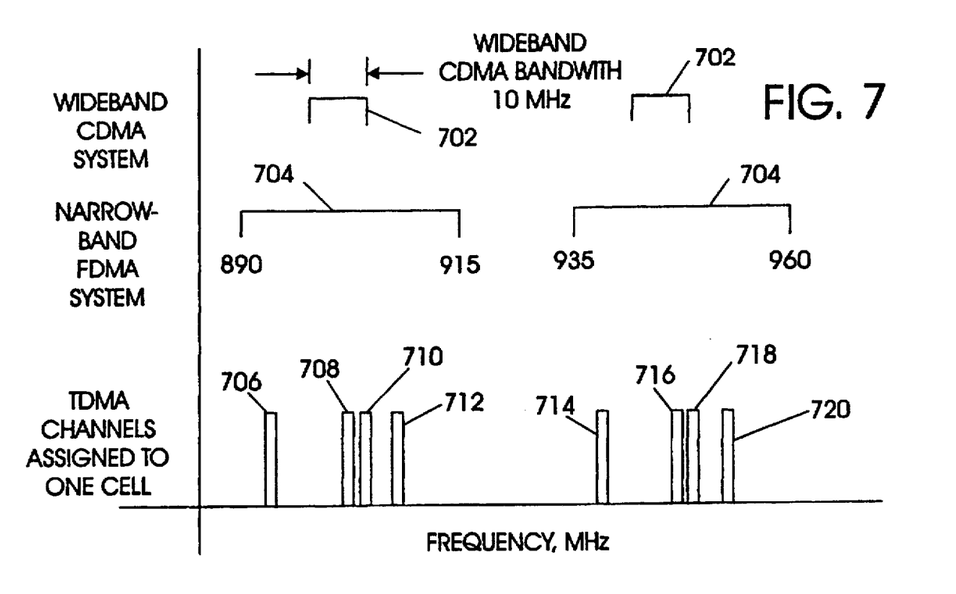
FIG. 7 is an illustration of possible frequency assignments for the FDMA/TDMA communications system and CDMA communications system of FIG. 1 according to an embodiment of the invention.

Within the common frequency range of the FDMA/TDMA radio base station and the CDMA base station, a possible frequency assignment plan for the embodiment of FIG. 1 is illustrated in FIG. 7. As shown in FIG. 7, in the embodiment the wideband CDMA frequency band 702 is on the order of 10 MHZ, with separate uplink and downlink bands for duplex communications. Obviously, other bandwidths and duplex arrangements are possible. In the embodiment, the narrowband FDMA/TDMA frequency range 704 comprises the GSM frequency range. For a particular cell, a first set of 200 kHz wide frequency bands 706–712 are assigned for receive and a second set of 200 kHz wide frequency bands 714–720 are assigned for transmitting. In the frequency assignment shown in FIG. 7, the wideband CDMA frequency band and the FDMA channels assigned to the narrowband FDMA/TDMA radio base station overlap within a common frequency range.

Figure 8A:
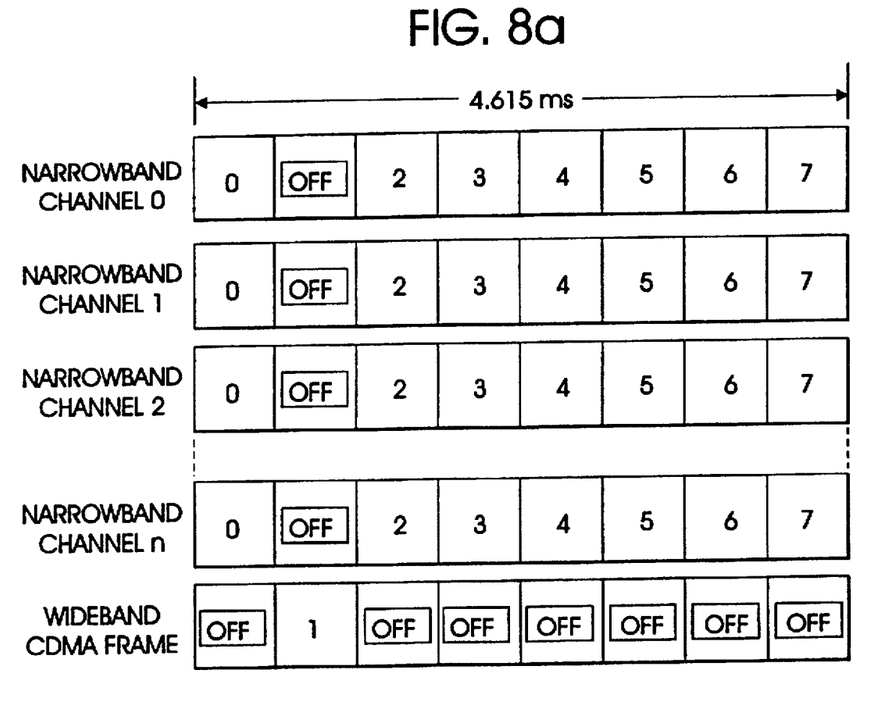
FIG. 8A is an illustration of timing relationships between the FDMA/TDMA communications system and the CDMA communications system of FIG. 1 according to an embodiment of the invention.
Figure 8B:
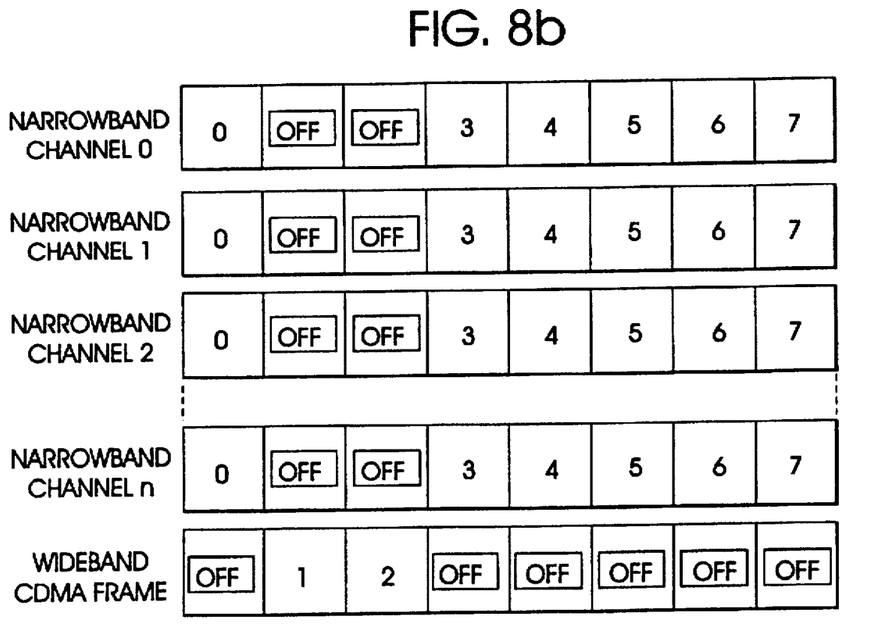
FIG. 8B is an illustration of an exemplary timing relationship between the FDMA/TDMA communications system and the CDMA communications system of FIG. 1 according to an alternative embodiment of the invention.

Interference between the narrowband FDMA/TDMA radio base stations, the wideband CDMA base stations of network 100 is avoided according to the present invention by reserving certain TDMA time slots for use by the narrowband FDMA/TDMA radio base stations and others for use by the wideband CDMA base stations. As an example, the timing relationships between FDMA/TDMA base station 200 and CDMA radio base station 400 is illustrated in FIG. 8A. As shown in FIG. 8A, time slot one on all the narrowband frequency channels o-n of FDMA/TDMA radio base station 200 is reserved for use by the wideband CDMA radio base station 400. During the remaining seven time slots, the narrowband FDMA/TDMA radio base station 200 operates in the normal manner and the wideband CDMA base station 400 is off. If more throughput is required on the wideband CDMA base station 400, more than one time slot can be reserved as illustrated in FIG. 8B. Management and synchronization of radio base stations 200 and 400 is performed by base station controller 500. The other radio base stations operate similarly using identical time slot assignments, with the exception being that the narrowband frequency channels assigned to each cell may be different.

In the embodiment of FIG. 1, where the narrowband FDMA/TDMA radio base station 200 is a GSM base station, it is possible to reserve downlink time slots for use by the wideband CDMA base station 400 with virtually no impact on the narrowband FDMA/TDMA system operation. In GSM, it is not necessary to transmit in all downlink time slots for a mobile station to maintain synchronization with the system.

In an alternative embodiment, where the narrowband FDMA/TDMA radio base station 200 is an IS-136 base station, it is not possible to reserve downlink time slots for use by the wideband CDMA base station 400. This is due to the fact that there are no guard bands between downlink time slots and the radio base station must transmit on all three time slots even if only one is active. In this instance, an alternative timing relationship of the invention is used where complete frames, rather than time slots, are reserved for use by the wideband CDMA base station 400.

It may be necessary for the wideband CDMA radio base station 400 to transmit a pilot channel at all times in order for mobile stations to obtain synchronization and a coherent reference for demodulation. The existence of the pilot channel in the time slots (or frames) reserved for narrowband operation will not present any measurable interference to narrowband FDMA/TDMA base station transmission and reception since the signal energy of the wideband pilot channel in any 200 kHz bandwidth will most likely be below the level of co-channel interference and thermal noise.

While the present invention has been described with respect to a particular embodiment, those skilled in the art will recognize that the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiment, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for sharing a common frequency band to permit communication by both a wideband CDMA (code-division, multiple-access) radio communication system having at least one CDMA radio base station and a narrowband TDMA (time-division, multiple-access) communication system having at least one TDMA radio base station, said method comprising the steps of:

dividing at least one carrier defined within the common frequency band into a plurality of time slots, groups of sequentially positioned time slots together forming a frame;

synchronizing the CDMA radio base station and the TDMA radio base station to a common timing sequence such that the time slots into which the at least one carrier is divided during said step of dividing are commonly defined to start and to end in synchronization in both of the CDMA communication system and the TDMA communication system;

allocating at least one time slot forming the frame for communications pursuant to the CDMA communication system;

allocating at least one time slot forming the frame for communications pursuant to the TDMA communication system; and broadcasting at least one burst of a CDMA communication signal during the at least one time slot of the frame allocated for communications pursuant to the CDMA communication system and at least one burst of a TDMA communication signal during the at least one time slot of the frame allocated for communications pursuant to the TDMA communication system.

2. The method of claim 1 wherein the CDMA radio base station broadcasts a pilot channel across all time slots of the frame into which the at least one carrier is divided.

3. The method of claim 1 wherein said step of broadcasting comprises the steps of:

transmitting the TDMA communication signal bursts from the at least one TDMA radio base station within a first at least one time slot of said plurality of time slots; and transmitting CDMA communication signal bursts from the at least one CDMA radio base station within a second at least one time slot of said plurality of time slots.

4. The method of claim 1 wherein said step of broadcasting comprises the steps of:

transmitting narrowband signal bursts from the at least one TDMA radio base station within a first at least one time slot of said plurality of time slots; and transmitting wide band signals from the at least one CDMA radio base station within a second at least one time slot of said plurality of time slots.

5. The method of claim 1 wherein said step of dividing comprises dividing a plurality of carriers defined within the common frequency band into the plurality of time slots.

6. The method of claim 5 wherein said step of allocating the at least one time slot for communications pursuant to the CDMA communication system comprises allocating at least one time slot defined upon each of the plurality of carriers.

7. The method of claim 5 wherein said step of allocating the at least one time slot for communication pursuant to the TDMA communication system comprises allocating at least one time slot defined upon each of the plurality of carriers.

8. Telecommunications network apparatus operable to communication CDMA communication signal bursts and TDMA communication signal bursts upon radio channels defined within a selected frequency band, the radio channels defined of carrier-time slot combinations, groups of sequentially-positioned time slots together forming a frame, said apparatus comprising:

at least one TDMA radio base station for generating and transmitting the TDMA communication signal bursts, the TDMA communication signal bursts transmitted by said TDMA radio base station during at least a first time slot of the frame;

at least one CDMA radio base station for generating and transmitting the CDMA communication signal bursts, the CDMA communication signal bursts transmitted by said CDMA radio base station during at least a second time slot of the frame; and a base station controller coupled to said TDMA radio base station and to said CDMA radio base station, said base station controller for synchronizing the TDMA radio base station and the CDMA radio base station to a common timing reference such that the TDMA communication signal bursts and the CDMA communication signal bursts transmitted during the at least the first time slot and the at least the second time slot are synchronized to be non-overlapping with one another.

9. The telecommunications network apparatus of claim 8 wherein said at least one CDMA radio base station further transmits on a pilot channel in said selected frequency band within both said first and second time slots.

* * * * *